United States Patent [19]

Adamson

[11] Patent Number: 4,728,877
[45] Date of Patent: Mar. 1, 1988

[54] METHOD AND APPARATUS FOR IMPROVING ELECTROCHEMICAL PROCESSES

[75] Inventor: Hugh P. Adamson, Boulder, Colo.

[73] Assignee: Adaptive Instruments Corp., Boulder, Colo.

[21] Appl. No.: 872,690

[22] Filed: Jun. 10, 1986

[51] Int. Cl.$^4$ .............................................. H02J 7/50
[52] U.S. Cl. ........................................ 320/21; 320/14; 320/35
[58] Field of Search ................... 320/4, 14, 20, 21, 35

[56] References Cited

U.S. PATENT DOCUMENTS 3,614,583 10/1971 Burkett et al. ..................... 320/21
4,385,269 5/1983 Aspinwall et al. .................. 320/21

OTHER PUBLICATIONS

Battery Charging Session, Investigation of Charging Methods for Nickel-Cadmium Batteries, Otto C. Wagner, Dorothy D. Williams, U.S. Army Technology and Devices Laboratory (ECOM), Fort Monmouth, NJ, pp. 96-98.

Primary Examiner—Patrick R. Salce
Assistant Examiner—Anita M. Ault
Attorney, Agent, or Firm—Gerald J. Ferguson, Jr.; Michael P. Hoffman; Michael J. Foycik, Jr.

[57] ABSTRACT

An electrochemical process and apparatus utilizing a positive and negative electrode. A current is periodically provided in a first direction between the electrodes through the electrolyte of the electrochemical process. The direction of the current is periodically reversed through the electrolyte to repolarize the electrodes, to at least decrease the electric double layer at the electrodes, and to exercise the electrolyte. The current is changed in response to voltage changes occuring across the electrodes caused by perturbations in the electrochemical process itself where the slope of the function representing the current change with respect to a voltage change caused by the perturbations is sufficiently large to enhance the repolarizing, the decreasing of the electric double layer and the exercizing of the electrolyte to thus effect improvement in the electrochemical process.

41 Claims, 8 Drawing Figures

METHOD AND APPARATUS FOR IMPROVING ELECTROCHEMICAL PROCESSES

BACKGROUND AND OBJECTS OF THE INVENTION

This invention relates to electrochemical processes and, in particular, to a method and apparatus for improving such processes.

Electrochemical processes can either be faradaic or non-faradaic where, in faradaic processes, the cell reactions are governed by Faraday's law and in non-faradaic processes, they are not. Faradaic reactions may either be galvanic (cell reactions occur spontaneously at the electrodes when they are connected externally by a conductor) or electrolytic (cell reactions are effected by the imposition of an external voltage greater than the reversible potential of the cell). Examples of galvanic processes include primary cells, secondary cells, fuel cells (e.g., an $H_2$—$O_2$ cell), etc. while examples of electrolytic processes include electrolytic synthesis (e.g., the production of chlorine and aluminum), electrorefining (e.g., copper), electroplating (e.g., silver and gold), etc. Recharging of a secondary cell may also be an electrolytic process. See "Electrochemical Methods" by A. Bard and L. Faulkner, 1981, John Wiley & Sons, New York for a further discussion of electrochemical processes in general.

One known source, and probably the most significant source of wasted energy, in electrochemical processes (faradaic and non-faradaic) is the electric double layer which tends to form at at least one of the electrodes of an electrochemical cell.

It is a primary object of this invention to provide an improved method and apparatus for lessening the effect of the electric double layer in electrochemical processes and thus enhancing the performance of such processes.

A battery charger is, of course, one well known device for improving the performance of a galvanic process where, as indicated above, such chargers may involve only an electrolytic process—that is, if the current direction through the electrolyte is only in the direction opposite to the current direction when the cell functions as a battery, only an electrolytic process is involved. This is typical of most battery chargers and little, if anything, is done to lessen the effect of the electric double layer on the charging process. Moreover, sulphanation of the electrodes tends to occur in such unidirectional chargers.

In one known process described in an article (copy submitted herewith) entitled "Investigation of Charging Methods for Nickel-Cadmium Batteries", by O. Wagner and D. Williams, there is described a charger in which a current pulse is applied in the charging direction and then a further current pulse is applied in the reverse direction. This procedure is repeated until the theoretical energy inputted is the battery capacity. However, in this process, the amount of current applied both during the charging pulse and the reverse current pulse is determined by the charging device connected to the battery.

It is thus a further object of this invention to provide an improved method and apparatus for improving the performance of electrochemical cells where the cell itself plays a significant role in determining the current it needs to effect efficient electrode repolarization, lessening or removal of the electric double layer, and exercising of the electrolyte to thus substantially enhance cell performance.

Other objects and advantages of this invention will be apparent from a reading of the following specification and claims taken with the drawing.

DETAILED DESCRIPTION OF PREFERRED EMBODIMENTS OF THE INVENTION

Figure 1:
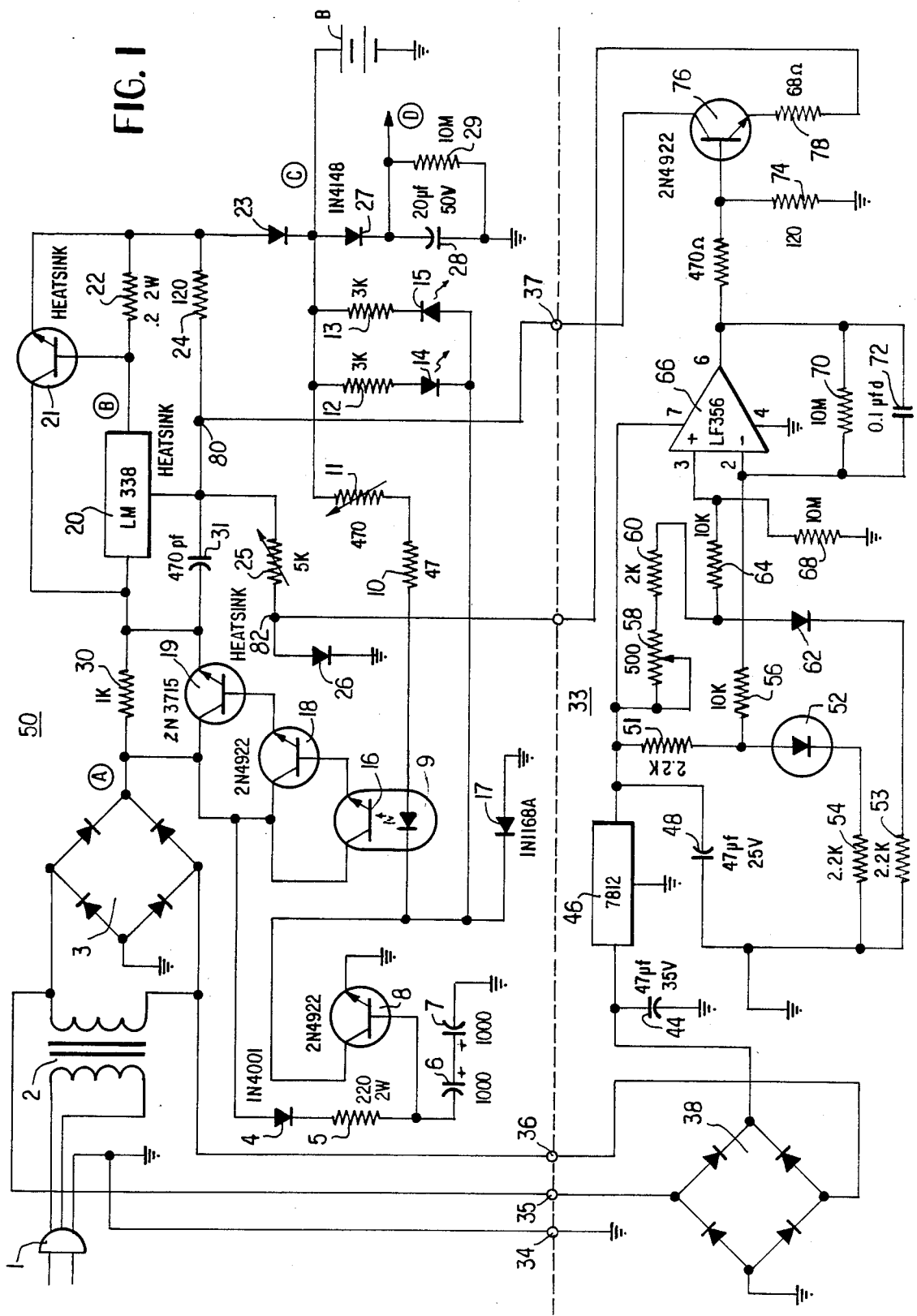
FIG. 1 is a schematic diagram of illustrative circuitry for use in improving electrochemical processes in accordance with the invention, the circuitry being shown with a battery to illustrate one of its uses as a battery charger.
Figure 2:
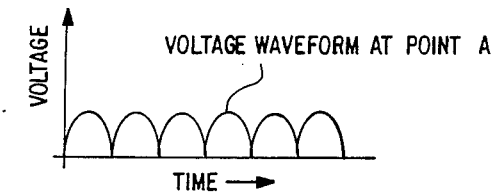
FIGS. 2 through 6 are illustrative voltage or current waveforms occurring at predetermined points in the circuitry of FIG. 1.

Referring to FIG. 1, there is illustrated a preferred embodiment of the invention when used as a battery charger. The battery charger circuitry is generally indicated at 50 and is connected to a battery B to be charged where battery B may be a primary cell, a secondary cell, a fuel cell, etc. The charger may include a plug 1 connected to standard 117 vac power, which is applied to a transformer 2 which reduces the line voltage and isolates the charger from the ac power. The transformer is connected to a full wave diode bridge 3 which generates a 120 hz, rectified, dc pulsatile voltage. Other frequencies may also be employed depending upon the nature of the electrochemical process being controlled by unit 50. For some processes the frequency of the controlling signal may be as high as 10 khz and for other processes it may even be higher. See FIG. 2 for the wave form produced at the output of full wave rectifier 3—that is, at the point indicated at A in FIG. 1.

Figure 3:
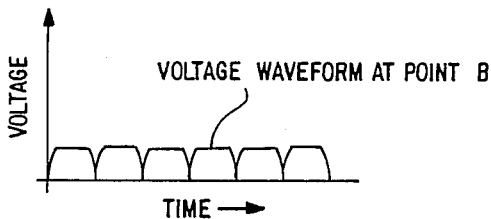

The output of the rectifier is applied to a voltage regulator 20 via a current limiting resistor 30, the purpose of which is to provide the minimum current necessary to keep regulator 20 on. Regulator 20 is a commercially available circuit which may be obtained from National Semiconductor Corp., for example, (Circuit Number LM338) and which limits the maximum amplitude of each pulsation of the dc pulsatile voltage to a predetermined SET voltage, as illustrated in FIG. 3. Transistor 21 and resistor 22 are optional items which may be employed if the charger needs to provide more current than the maximum available from regulator 20, as will be explained in more detail hereafter. The output of the regulator is applied through a diode 23 to battery B to effect the charging thereof. As will be brought out in more detail hereinafter, the rated current of diode 23 is preferably very large (e.g., 35 amps) in order to utilize the logarithmic region thereof as the voltage on battery B nears its endpoint.

Also connected to regulator 20 are resistor 24, adjustable resistor 25, and diode 26 which in turn is connected to ground. Elements 24 through 26 are employed to establish the SET voltage for regulator 20, this being accomplished by adjusting adjustable resistor 25.

The output of rectifier 3 is also connected to the base of a transistor 8 via a diode 4 and a resistor 5 where capacitors 6 and 7 smooth the voltage applied to the base. Whenever charger 50 is connected to the 117 vac power supply, transistor 8 will be on and vice versa. When the transistor is on, it establishes a current path from the output terminal OUT (at the cathode of diode 23) through adjustable resistor 11, resistor 10, and LED 9 where LED 9 is part of an optical transistor coupler, the transistor of the coupler being indicated at 16. The optical transistor coupler is connected in Darlington connection to transistors 18 and 19 such that transistors 16, 18 and 19 provides a by-pass current path around current limiting resistor 30 whenever LED 9 turns transistor 16 on. Capacitor 31 is employed to stabilize the operation of regulator 20.

A current path is also established between the OUT terminal through transistor 8 via resistor 12 and LED 14 such that when light is emitted by LED 14, an indication is provided that battery B is correctly connected to charger 50, proper connection of the battery being shown in FIG. 1. If the battery is incorrectly connected to the charger, a current path is established between the OUT terminal and ground via resistor 13, LED 15, and diode 17. LED 15 will emit light to indicate the improper connection. Moreover, diode 17 protects the charger if the battery is connected backwards.

Figure 5:
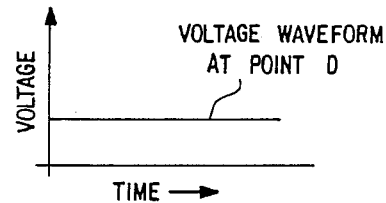

Also connected to the OUT terminal are a diode 27, a capacitor 28, and a resistor 29 in parallel with the capacitor such that at the terminal indicated at D, a dc voltage is provided which may be measured to enable setting of regulator 20 or monitoring of the charging of battery B. See FIG. 5.

An optional temperature controller circuit generally indicated at 33 is connected to circuit 50 at terminals 34-37, the purpose of the circuit being to change the SET voltage of regulator 20 so that it is correct for battery B and also to make certain diode 23 is in its logarithmic region of operation, if battery B has a tendency to overheat. The circuit 33 includes a full wave rectifier connected in parallel with rectifier 3. The rectifier output is applied to a capacitor 44, a regulator 46, and a capacitor 48, which provide a dc output. This dc output is applied to (a) a first voltage divider including resistor 51, a remote sensor 52 located at the battery B to sense the temperature thereof in a known manner, and a resistor 54, (b) a second voltage divider including a potentiometer 58, resistor 60, diode 62, and resistor 53, and (c) a differential amplifier 66. The output of the first voltage divider is applied to the minus input of the differential amplifier through resistor 56 while the output of the second voltage divider is applied to the plus input thereof through resistor 64. Resistor 70 and capacitor 72 are connected between the output of the differential amplifier and its minus input. The output of amplifier 66 is applied to terminal 80 of circuit 50 via the collector of transistor 76 while terminal 82 of circuit 50 is returned to the emitter of transistor 76 via resistor 78. The base of the transistor is connected to ground via resistor 74.

In operation, assume an automobile battery is to be charged and is connected as shown in FIG. 1 to charger 50. The expected endpoint voltage across the battery electrodes is about 15.6 volts for such a battery when fully charged. In this case, the regulator is typically set to about 1 volt above the expected endpoint voltage of the battery charging process (assuming diode 23 is a silicon diode) or about 16.6 volts as will be explained in more detail below.

Adjustable resistor 11 is typically set that the current drawn from battery B will be insufficient to turn the optical transistor coupler 9,16 on unless the initial voltage across the battery is at least one-half the rated voltage, the rated voltage for automobile batteries typically being 12 volts. Of course, resistor 11 could also be set to be sensitive to other percentages of the battery's rated voltage. Thus, assuming its initial voltage is 7 volts, sufficient current will be supplied from the battery through resistors 10 and 11, LED 9, and transistor 8 to ground to turn the optical transistor coupler 9,16 on. Thus the pulsating output from rectifier 3 will be amplified by the Darlington connection 16, 18, 19 and applied to regulator 20 where the maximum amplitude of each cycle of the pulsating wave form will be limited or "squared off" to 16.6 volts. Hence, the output of regulator 20 is sinusoidal until the SET voltage of 16.6 volts of the regulator is reached and then the voltage levels off at the SET voltage until the output voltage from rectifier 3 falls below the SET voltage. See FIG. 3 for the form of the voltage occurring at the output of the regulator.

Initially the voltage difference across diode 23 will be about 9.6 volts (16.6 less 7.0) and it will be driven into its linear range such that current will be delivered to the battery to thus increment the voltage thereof. At the same time, current will be applied back through resistors 11, 10 and 9 to maintain operation of the optical transistor coupler as the pulsating wave form is applied to the regulator 20 through the Darlington connection.

As the voltage at the anode of diode 23 drops below the battery voltage at the end of the first cycle of the pulsating wave form, the diode will be reversed biased and the current in battery B will be reversed and discharged through resistors 10 and 11, LED 9, and resistor 12 and LED 14 and transistor 8 to ground. This periodic reversal of the current in the battery repolarizes the electrodes thereof, at least lessens the electrical double layer, and exercises the electrolyte, and thus prepares the battery for the next pulsation thereof.

In the foregoing manner, the battery volatge will be increased. As the battery voltage increases, the voltage across diode 23 decreases. Eventually, the diode voltage will decrease until it enters its logarithmic range of operation. The typical logarithmic range for a silicon diode is from the turn on voltage (positive current flow) to about 1.2 V. The current dynamic range is generally >100,000. In this application the turn on voltage is assumed to be 0.6 V (positive voltage anode to cathode). The logarithmic range of operation typically extends from about 0.6 volts to about 1.2 volts for all silicon diodes regardless of the current rating thereof. In the present example, the diode will enter its logarithmic region of operation when battery B has been charged to about 15.4 volts—that is, since voltage regulator 20 has been set to 16.6 volts, the voltage across diode 23 will be about 1.2 volts when the battery voltage reaches about 15.4 volts.

Figure 7:
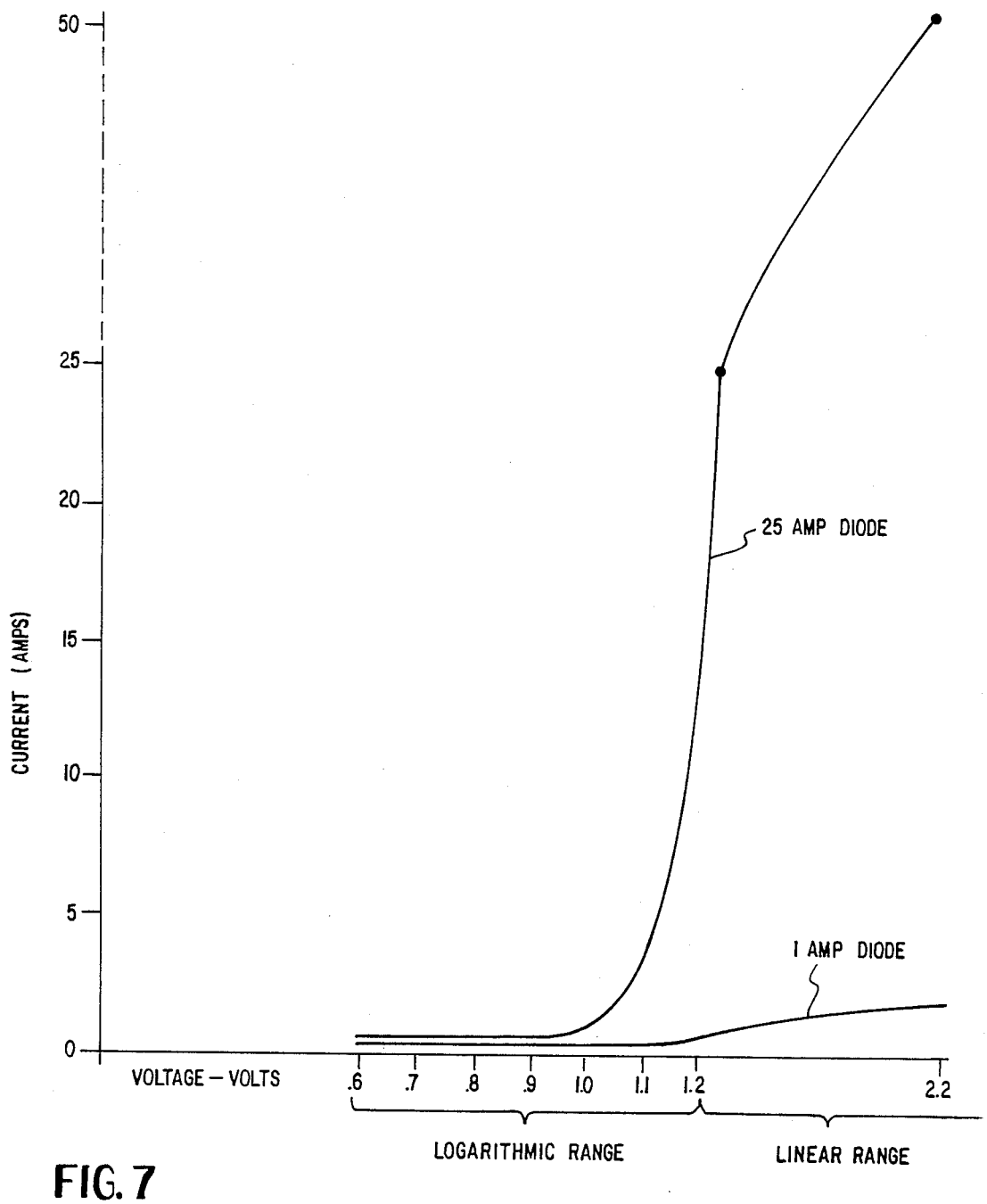
FIG. 7 illustrates waveforms of the logarithmic and linear regions of a diode suitable for use in the invention and another diode not suitable for such use.

As can be seen in FIG. 7 there is about a ten fold increase (or decrease) in current for each 0.1 volt increase (or decrease) in voltage across diode 23 in its logarithmic region of operation—that is, from about 0.6 volts to about 1.2 volts. The present invention takes advantage of the foregoing characteristic in the following manner. As the electrochemistry changes dynamically within the battery, it causes voltage fluctuations or pertubations across itself. These voltage changes, even though very small, will cause large current changes of the type described above in the logarithmic region. Thus, as the voltage across battery B reaches its endpoint voltage of 15.6 volts (the SET voltage of 16.6 volts having previously been set to 1 volt more than the endpoint voltage), the endpoint voltage will clearly be within the logarithmic range of the diode since the voltage across the diode is one volt (16.6 less 15.6) where, of course, one volt falls within the about 0.6–1.2 volt logarithmic range of the diode. Hence, perturbations of the battery voltage induce current changes dictated by the battery. The change in current per unit change in the voltage is substantially greater than one (approximately 10 in this example) and is controlled by the battery being charged. This process also occurs when the voltage decreases below the SET voltage of regulator 20 and reaches a voltage level 1.2 volts above the current voltage of the battery.

As stated above, the current reversal which occurs in the linear range of operation of the diode (diode voltage typically greater than 1.2 volts, see FIG. 7) does effect a certain degree of electrode repolarization, lessening of the electric double layer, and exercising of the electrolyte. However, this effect is substantially enhanced when the diode enters its logarithmic region of operation since the voltage perturbations occurring across the battery electrodes due to the dynamics of the electrochemical process induce much larger currents through the electrolyte.

In order to insure entry of the diode into its logarithmic mode of operation, at least an upper limit and preferably a lower limit should be established for the SET voltage. In general, the magnitude of the SET voltage, $V_{SET}$, should satisfy the following inequality:

$$V_{E.P.} + V_{D2} > V_{SET} > V_{E.P.} + V_{D1} \quad (1)$$

where $V_{E.P}$ is the expected endpoint voltage for the process, $V_{D2}$ is the upper limit voltage of the logarithmic range of operation of the diode and $V_{D1}$ is the lower limit voltage of the logarithmic range.

Figure 4:
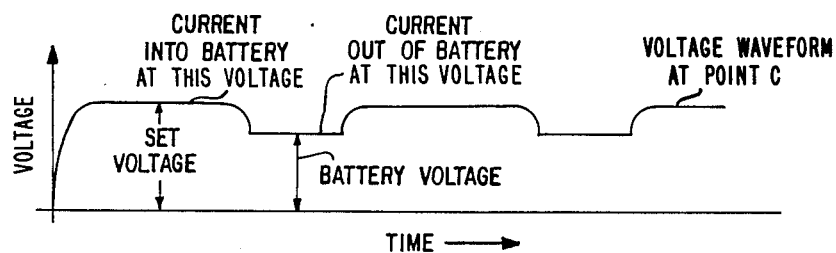
Figure 6:
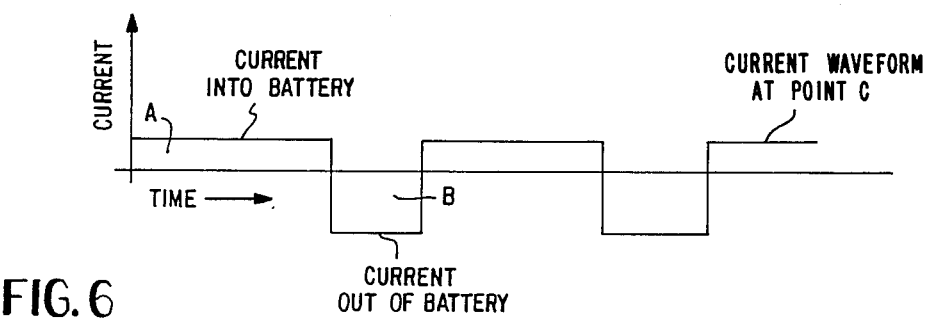

If $V_{SET}$ is greater than $V_{E.P.} + V_{D2}$, the logarithmic range will not be entered. Thus, in the foregoing example where $V_{E.P.}$ is 15.6 volts and $V_{D2}$ is 1.2 volts, $V_{SET}$ should not be greater than 15.6+1.2 or 16.8 volts. Otherwise, the logarithmic region will not be entered to obtain the desirable results of this invention. Moreover, $V_{SET}$ should preferably not be less than $V_{E.P.} + V_{D1}$. If it is, there may not be sufficient current to maintain electrode repolarization, electric double layer removal, and electrolyte exercising after the endpoint is reached. In this regard, reference should be made to FIG. 6 which illustrates the current waveform when the endpoint voltage is properly chosen with respect to the logarithmic range—that is, when the endpoint voltage falls within the logarithmic range. An equilibrium is established where the charge flowing into the battery is equal to that flowing out—that is, the area A equals the area B in FIG. 6. The voltage which occurs at the OUT terminal at this time is illustrated in FIG. 4. In this regard, it should be noted the battery itself will select the foregoing equilibrium point and that this point may, in some instances, be below the nominal cut-off voltage for the diode.

From the above, it can be seen that, if the endpoint voltage is to fall within the logarithmic range of the diode where the logarithmic range extends from 0.6 volts to 1.2 volts in the above example, $V_{SET}$ should satisfy at least the upper limit of inequality (1). Preferably to insure entry of the diode into its logarithmic mode of operation, inequality (1) may be modified as follows:

$$V_{E.P.} + V_{D2} - 0.1 \text{ volt} > V_{SET} > V_{E.P.} + V_{D1} + 0.1 \text{ volt} \quad (2)$$

Thus, in the example given above, the upper limit on $V_{SET}$ is 16.7 volts. Subtracting the endpoint voltage of 15.6 volts gives 1.1 volts across the diode to thus insure the logarithmic mode of operation. The lower limit on $V_{SET}$ will be 16.3 volts and subtracting $V_{E.P.}$ gives 0.7 volts across the diode again insuring the logarithmic mode of operation. More specifically, it is preferable that $V_{SET}$ be set about 1 volt above $V_{E.P.}$, as in the above example, for a silicon diode.

$V_{D2}$ and $V_{D1}$ can readily be determined for any diode from a handbook therefor where diode 23 may, for example, be a silicon 1N1186A diode having a current rating of 35 amps. Moreover, $V_{E.P.}$ is known for many galvanic cells. In general 140% of the original energy of the battery should be returned to the cell to effectively recharge it. Thus, for a typical two volt per cell, lead acid automobile battery with six cells, about 2.6 volts per cell is required for recharging. Thus, the endpoint voltage is about 15.6 volts for the six cells of the battery, as assumed above. For 1.2 volt per cell Nicad batteries, the endpoint voltage per cell is 1.42 volts. Furthermore, the expected endpoint voltage for any galvanic cell including primary cells can be readily determined from electrode potentials given in handbooks. Thus, since the $V_{E.P.}$, $V_{D1}$, and $V_{D2}$ can be readily determined, $V_{SET}$ can also be readily determined. This, of course, is especially true if $V_{SET}$ is simply chosen as about 1 volt above the endpoint voltage assuming the diode is silicon.

The monitor circuit including diode 27, capacitor 28, and resistor 29 is typically used to provide a determination of when the process has reached its endpoint voltage. In particular, the current through diode 23 will decrease as the process nears the endpoint voltage until it reaches the current associated with the endpoint voltage. A voltage measuring device (not shown) connected to point D can be so calibrated to indicate whether the measured voltage corresponds to a current through diode 23 which would occur in the logarithmic range of the diode. Assuming the SET voltage has initially been correctly set, the measuring device will indicate the endpoint of the process is occurring in the logarithmic range. If the SET voltage has been set too high, this will also be indicated by the measuring device since it will stabilize when the endpoint is reached and the current passed by diode 23 will be larger than what it should be for the diode to be in its logarithmic mode. This can simply be corrected by decreasing the SET voltage via adjustable resistor 25 until the endpoint is properly within the diode's logarithmic region. Further, the measuring device may be monitored by a controller (not shown), such as a programmed computer, to automatically lower the SET voltage until the endpoint is properly within the diode's logarithmic range.

From the foregoing, it can be seen the charging of the battery is controlled by the parameters of the charging process itself. The amount of current through the battery is controlled rapidly and dynamically as a function of the back voltage expressed by the battery, this current is applied to the battery on a repetitive basis at a 120 hz frequency and at duty cycles of less than 100 percent. The remaining part of the duty cycle is a discharge current which repolarizes the ionic conductor interface within the cell. The repetitive positive voltage is "square topped" at a predetermined SET voltage. This combination allows for currents at a rate that is controlled by the chemical reactions at the electrodes and controlled by the rate of mixing and mass transport of those reactant species at the electrode sites. The current transform preferably operates over a wide range, perhaps 0 to 50 mhz. This process achieves high rates of charging without appreciable heating by virtue of reaction rate control.

As stated above, temperature controller 33 has as its purpose the correction of the SET voltage of regulator 20 so that it is correct for battery B and also to make certain diode 23 is in its logarithmic region of operation. In the operation of controller 33, remote diode sensor 52 is typically such that, if a small (not causing heat) current flows through sensor 52, the potential across this diode will decrease by typically about 2.2 millivolts/°C. for the range 0°–100° C. The ambient sensor diode 62 senses room temperature and with the potentiometer 58 is set so that when the remote sensor 52 detects an increase of about 10° C. in battery B, it causes the output of the amplifier 66 to increase which causes regulator 20 to decrease the SET voltage. The controller 33 thus guarantees the SET voltage to be correct for battery B and also causes diode 23 to be in its logarithmic range.

As indicated above, the SET point plays an important role in the embodiment of FIG. 1 in that it establishes a voltage at the anode of diode 23, during charging of the battery, against which the battery voltage, and, ultimately, the battery endpoint voltage is referenced to thereby ensure placement of the endpoint voltage within the diode's logarithmic range.

Another important consideration leading to the improved results of the FIG. 1 embodiment is the operation of diode 23 in its logarithmic region as the battery voltage approaches its endpoint. As the voltage perturbations occurring because of the electrochemical changes induce large current changes in the voltage supplied by diode 23, the effect of these large current changes is to enhance breakdown of the electric double layers which form at the battery electrodes. These layers are probably the most significant source of energy loss in most if not all electrochemical processes. By breaking down these layers in the manner described above, the present invention is able to recharge the battery to its maximum voltage at a high rate of charging without appreciable heating. Not only does the operation of the diode in its logarithmic range probably break down the electric double layers, but it also enables the electrolyte to be exercised in a vigorous manner (due to the large changes in current provided by diode 23) to thus obtain optimum rejuvenation of the battery.

Together with the foregoing features, the reversal of the current through the battery during each pulsation of the wave form is significant in that, as stated above, this reversal of current repolarizes the battery electrodes to thus permit subsequent exercising of the electrolyte and assist in the removal of the electric double layers during the subsequent positive cycles of the wave form.

In summary, at least three features are significant with respect to the FIG. 1 embodiment—that is, (a) the establishment of a reference voltage through the SET voltage of regulator 20, against which the voltage perturbations across the battery can be referenced as the electrochemical changes occur, (b) the operation of diode 23 in its logarithmic range as the battery approaches the reference established by the SET voltage of regulator 20, and (c) the reverse current which repolarizes the battery electrodes to permit the subsequent exercising of the electrolyte and removal of the electric double layers to thus optimize the voltage to which the battery is charged.

In general, it can be seen that, as the endpoint voltage to which a particular battery can be charged is approached, the battery charger 50 including diode 23, which is being operated in its logarithmic region, may be considered a logarithmic current source controlled by the voltage occurring across the battery it is charging. In short, the current source (charger 50) for a load (battery B) is controlled by voltage occurring across and fed back from the load to obtain the advantageous results of the present invention.

It should be noted diodes have been employed in prior art battery chargers at a position generally corresponding to the position of diode 23 in charger 50. However, the rating of such diodes has been substantially smaller than that intended for use in the present invention. Thus, a one amp diode might be used in the prior art chargers where the intent has been to quickly drive the diode into its linear range (see FIG. 7 curve illustrating typical operation thereof) such that the loss through the diode would be minimized. Where the rating of the prior art diodes might typically be one amp, the rating of diode 23 of the present invention would typically be about 25 amps to ensure the enhanced logarithmic mode of operation described above.

It should be further appreciated that logarithmic current sources other than a diode may be employed in the present invention. Further, the current source need not be logarithmic but should have a large current to voltage ratio at least when operating at or near the process endpoint voltage. In general, the slope of the curve representing the current change versus unit voltage change should at least be five and preferably be at least ten. It is to be understood the foregoing and all other generalizations of the invention mentioned herein apply to all embodiments of the invention including both the faradaic and non-faradaic utilizations thereof.

The endpoint voltage depends upon the particular characteristics of battery B. The electrochemical changes within a particular battery will depend upon the particular composition of the electrolyte thereof together with the particular construction of the battery. Since no two batteries could be expected to be exactly the same in every particular with respect to the foregoing parameters, it can be seen that the voltage perturbations that are generated by the electrochemical changes within the battery as it approaches its endpoint voltage will be different for each battery. Thus, in accordance with tests performed in accordance with the invention, one nicad communication battery had its capacity improved from 100 percent to 131 percent while certain lead acid batteries were recharged to 92.8 percent and 92.39 percent capacity. With respect to the latter two batteries, they each originally had 97 percent capacity. They were then subjected to three seven day deep discharge cycles with one 24 hour charge each cycle. Then they were subjected to one thirty day deep discharge cycle with one 24 hour charge with the charger of FIG. 1 and the above results were obtained. Typically, to do better than 80 percent is considered to do very well so it can be seen that the results obtained with the present invention are indeed excellent.

The foregoing embodiment of the invention is, of course, directed to its use as a battery charger for galvanic cells. However, it is to be understood the invention is useful with all electrochemical processes of the faradaic or non-faradaic type as discussed above. In each of these processes, the repolarization of the electrodes, the exercising of the electrolyte and the breaking down of the electric double layers result in substantial improvements of the process.

Figure 8:
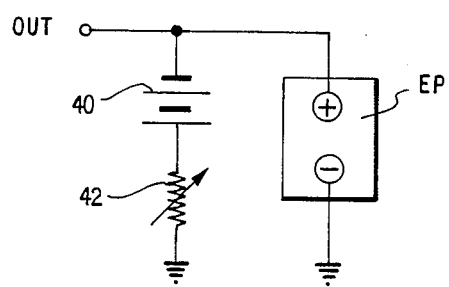
FIG. 8 is a schematic diagram of a modification to the system of FIG. 1 which illustrates another use of the circuitry of FIG. 1 for use in an electroplating system.

To further illustrate the use of the invention with an electrolytic process such as electroplating, assume the circuitry shown in FIG. 8 is connected to the OUT terminal of circuit 50 of FIG. 1 in place of battery B where battery 40 is employed to provide a reverse current and adjustable resistor 42 limits the reverse current to about 10 percent the plating current delivered by circuit 50.

In the FIG. 1 battery charger embodiment, cell voltage typically increases with time until the endpoint voltage is reached as is typical when the invention is used to improve a galvanic process. However, when the circuitry 50 is used as a current source for an electrolytic process such as electroplating, the set voltage should be so chosen that the current through the cell electrodes remains substantially within the logarithmic range of diode 23 for the entirety of the process. Thus, there is no point in time during the process when the diode enters its linear mode of operation—that is, changes from its logarithmic to its linear mode. Hence, when using the FIG. 1 circuit as a current source for an electroplating process, it is only necessary to determine the current needed for the process and then select a diode whose logarithmic range includes the current needed for the process. Thus, if 6 amps are needed for the process and the rated current of the diode is 25 amps (note diodes are rated at the transition point from the logarithmic to the linear range and thus the foregoing diode will conduct 25 amps at the upper limit of its logarithmic range), the 6 amps needed for the process will clearly be within the logarithmic range of the diode. In general, the current required for the process should be less than the rated current of the diode. In this straightforward manner, low stress, level platings are obtained without appreciable heat.

The current needed for some processes such as electroplating may exceed the maximum current deliverable from regulator 20. This is provided for in the present invention in the following manner. When the output of regulator 20 exceeds 5 amperes, for example, transistor 21 will be turned on to thus provide the additional current needed for such processes.

Although the foregoing advantages of the invention are understood and described in terms of electrode repolarization, electric double layer removal, and exercise of the electrolyte, there is no intent to be limited to a particular theory of operation. Moreover, the values of the components shown in FIG. 1 (where resistors are in ohms and capacitors in μf) are intended to be illustrative and not limitative. The part numbers for components such as diodes, transistors and circuit blocks are in general use and may be obtained from the National Semiconductor Corp., for example. These also are intended to be illustrative.

It is to be understood that the above detailed description of the various embodiments of the invention is provided by way of example only. Various details of design and construction may be modified without departing from the true spirit and scope of the invention as set forth in the appended claims.

What is claimed is:

1. Apparatus for improving the operation of an electrochemical system utilizing at least one positive and at least one negative electrode, said apparatus comprising
means for periodically applying a voltage across said electrodes to provide a current in a first direction between the electrodes through the electrolyte of the electrochemical system;
means for periodically reversing the direction of the current through the electrolyte; and
said means for periodically applying the voltage including current changing means for changing said current in response to voltage changes occurring across said electrodes caused by perturbations in said electrochemical process where the slope of the function representing the current change with respect to a voltage change caused by said perturbations is at least five.

2. Apparatus as in claim 1 where said slope is at least ten.

3. Apparatus as in claim 1 where said electrochemical system is faradaic.

4. Apparatus as in claim 3 where said system is galvanic.

5. Apparatus as in claim 4 where said system includes a battery which is charged by said apparatus.

6. Apparatus as in claim 5 where said battery is a primary cell.

7. Apparatus as in claim 5 where said battery is a secondary cell.

8. Apparatus as in claim 5 where said battery is a fuel cell.

9. Apparatus as in claim 5 where said current changing means includes a diode and where said means for periodically applying said voltage to said electrodes applies said voltage for a sufficient length of time to charge said battery to an endpoint voltage in the logarithmic region of operation of the diode.

10. Apparatus as in claim 9 where said means for applying said voltage to said electrodes includes means for generating a series of voltage pulses for application to said electrodes where each pulse has a maximum voltage amplitude, $V_{SET}$.

11. Apparatus as in claim 10 where said means for generating said series of voltage pulses includes means for providing a full-wave rectified waveform and means for limiting the amplitude of each cycle of the waveform to $V_{SET}$ for a predetermined portion of each cycle.

12. Apparatus as in claim 10 where said means for generating said series of voltage pulses includes means for adjusting the magnitude to $V_{SET}$ such that $$V_{E.P.} + V_{D2} > V_{SET}$$

where $V_{E.P.}$ equals said endpoint voltage, $V_{D2}$ equals the upper limit voltage of said logarithmic range.

13. Apparatus as in claim 12 where said means for adjusting the magnitude of $V_{SET}$ is so adjusted that $$V_{SET} > V_{E.P.} + V_{D1}$$

where $V_{D1}$ is the lower limit voltage of said logarithmic range.

14. Apparatus as in claim 10 where said means for adjusting the magnitude of $V_{SET}$ is so adjusted that $V_{SET} = V_{E.P.} + 1$ volt.

15. Apparatus as in claim 9 where said means for periodically reversing the current direction through the electrolyte includes said battery.

16. Apparatus as in claim 15 where said means for periodically applying voltage to said electrodes includes means for establishing a current path for said reverse direction current from said battery.

17. Apparatus as in claim 10 where said diode is so disposed between said means for generating said series of voltage pulses and said battery that it is forward biased by said voltage pulses.

18. Apparatus as in claim 17 where said means for applying said voltage includes a current path and where said means for periodically reversing the current includes said battery which reverse biases the diode and is discharged through said current path back to the battery.

19. Apparatus as in claim 10 including means responsive to the temperature of said battery for adjusting $V_{SET}$ so that said endpoint voltage remains within the logarithmic range of the diode with temperature changes of the battery.

20. Apparatus as in claim 5 including means responsive to the temperature of said battery for maintaining said endpoint voltage within the logarithmic range of the diode with temperature changes of the battery.

21. Apparatus as in claim 3 where said system is electrolytic.

22. Apparatus as in claim 21 where said system comprises an electrolytic synthesis system.

23. Apparatus as in claim 21 where said system comprises an electroplating system.

24. Apparatus as in claim 21 where said system comprises an electrorefining system.

25. Apparatus as in claim 21 where said current changing means includes a diode and where said means for periodically applying said voltage provides a requisite amount of said current to effect the process of said electrolytic system, the magnitude of said current being less than the rated voltage of the diode to thus effect said process in the logarithmic range of the diode.

26. Apparatus as in claim 25 where said means for applying said voltage to said electrodes includes means for generating a series of voltage pulses for application to said electrodes where each pulse has a maximum voltage amplitude, $V_{SET}$.

27. Apparatus as in claim 26 where said means for generating said series of voltage pulses includes means for providing a full-wave rectified waveform and means for limiting the amplitude of each cycle of the waveform to $V_{SET}$ for a predetermined portion of each cycle.

28. Apparatus as in claim 21 where said means for periodically reversing the current direction through the electrolyte includes a electrical current source connected to the electrolytic system.

29. Apparatus as in claim 28 where said means for periodically applying said voltage to said electrodes includes means for establishing a current path for said reverse direction current from said electrolytic system.

30. Apparatus as in claim 26 where said diode is so disposed between said means for generating said series of voltage pulses and said electrolytic system that it is forward biased by said voltage pulses.

31. Apparatus as in claim 30 where said means for periodically reversing the current includes a electric current source connected to the electrolytic system which reverse biases the diode and which causes said reverse current to flow from the battery through the electrolytic system and then back to the battery.

32. Apparatus as in claim 1 where said electrochemical system is non-faradaic.

33. In an electrochemical process utilizing at least one positive and at least one negative electrode, the improvement of
periodically applying a voltage across said electrodes to provide a current in a first direction between the electrodes through the electrolyte of the electrochemical process;
periodically reversing the direction of the current through the electrolyte; and
changing said current in response to voltage changes occurring across said electrodes caused by perturbations in said electrochemical process where the slope of the function representing the current change with respect to a voltage change caused by said perturbation is at least five.

34. The improvements as in claim 33 where said slope is at least ten.

35. The improvement as in claim 33 where said electrochemical process is faradaic.

36. The improvement as in claim 35 where said process is galvanic.

37. The improvement as in claim 35 where said process is electrolytic.

38. The improvement as in claim 33 where said electrochemical process is non-faradaic.

39. In an electrochemical process utilizing at least one positive and at least one negative electrode, the improvement of
periodically providing a current in a first direction between the electrodes through the electrolyte of the electrochemical process,
periodically reversing the direction of the current through the electrolyte to repolarize said electrodes, to at least decrease the electric double layer at said electrodes, and to exercise said electrolyte; and
changing said current in response to voltage changes occurring across said electrodes caused by perturbations in said electrochemical process where the slope of the function representing the current change with respect to a voltage change caused by said perturbations is sufficiently large to enhance said repolarizing, said decreasing of the electric double layer and said exercising of the electrolyte to thus effect improvement in the electrochemical process.

40. The improvement in claim 39 where said slope is at least five.

41. The improvement in claim 40 where said slope is at least ten.

* * * * *